Aug. 31, 1965  H. G. MATHEWS  3,203,043
LAMINATING PRESS MOLD FOR MANUFACTURING CELLULAR PRODUCTS
Filed Oct. 13, 1961  2 Sheets-Sheet 1
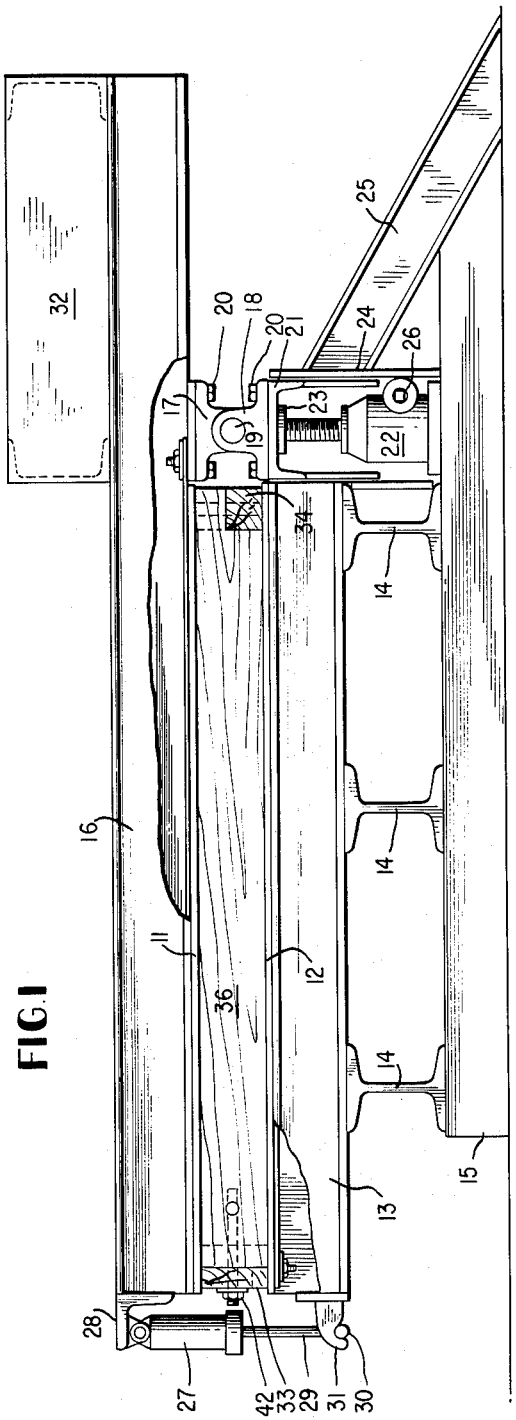
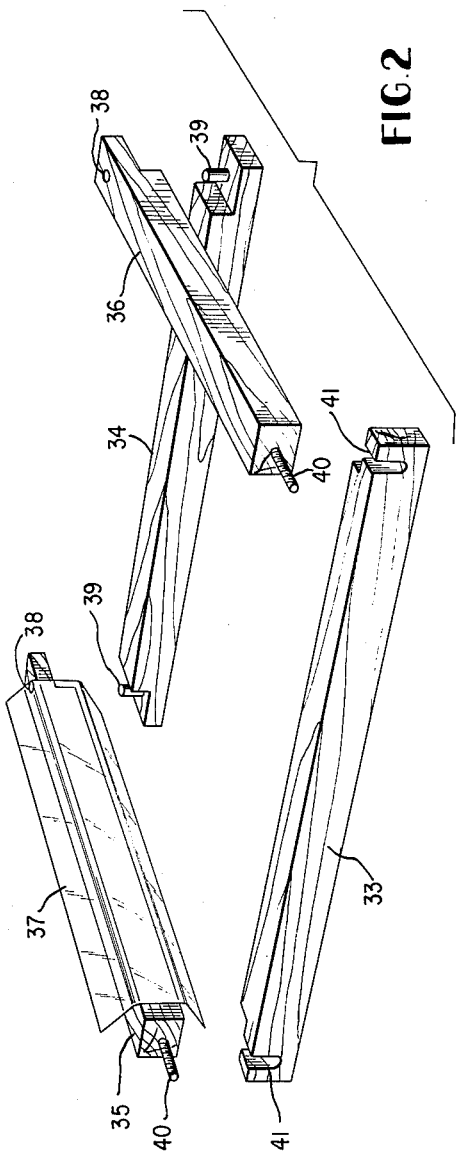
INVENTOR.
HOWARD G. MATHEWS
BY
ATTORNEYS Aug. 31, 1965  H. G. MATHEWS  3,203,043
LAMINATING PRESS MOLD FOR MANUFACTURING CELLULAR PRODUCTS
Filed Oct. 13, 1961  2 Sheets-Sheet 2
FIG.3
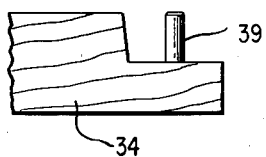
FIG.4
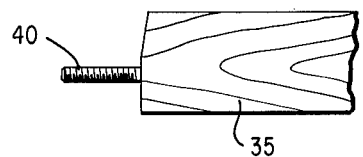
FIG.5
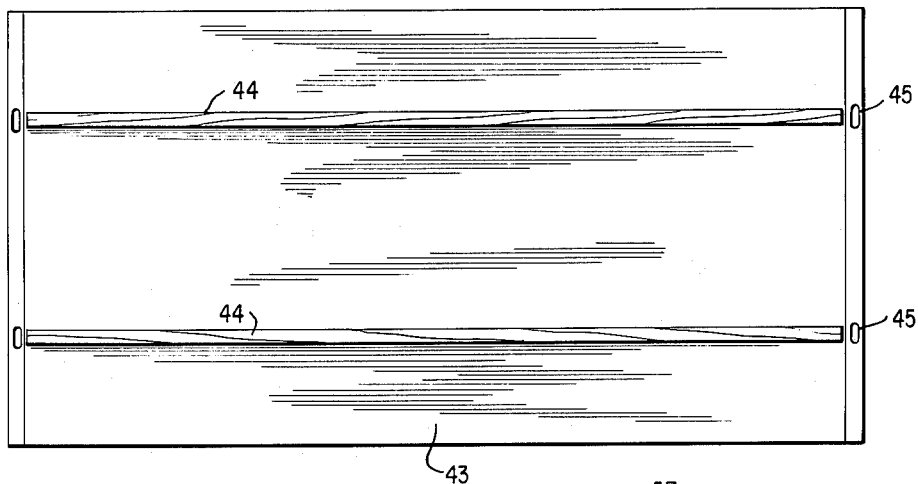
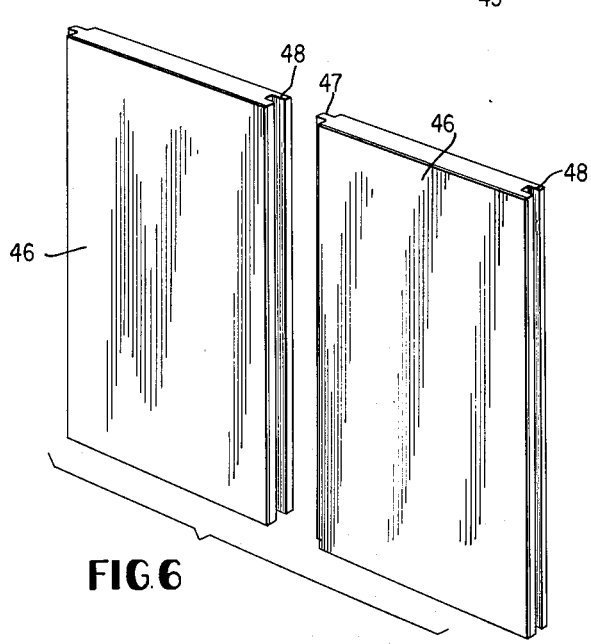
FIG.6
FIG.7
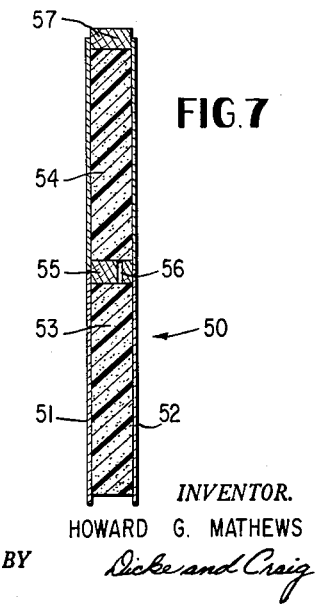
INVENTOR.
HOWARD G. MATHEWS
BY Dicke and Craig
ATTORNEYS

# United States Patent Office 3,203,043
Patented Aug. 31, 1965

3,203,043
LAMINATING PRESS MOLD FOR MANUFACTURING CELLULAR PRODUCTS
Howard G. Mathews, 2 Pensdale Lane, Levittown, N.J.
Filed Oct. 13, 1961, Ser. No. 144,877
6 Claims. (Cl. 18—5)

The present invention relates to an improved apparatus for manufacturing articles in an essentially slab-like form, and to the resulting product. One embodiment of the present invention will be described in connection with a laminating press mold suitable for manufacturing either rigid cellular foams for use in coolers, cold-storage units, buildings and transportation equipment, or for manufacturing flexible foams for use in furniture and as mattresses. Preferably the rigid foams produced in accordance with the present invention have at least one laminate layer bonded thereto in the mold. The foam may also be provided with reinforcing elements during the molding operation. The contours of the mold are varied in accordance with the ultimate use to which the product is to be put. For example, in the manufacture of rigid foam products, the mold may be contoured so that the resulting products have edge portions forming overlapping joints to facilitate assembly of one of the panels with another.

It is known to produce a foam product from a liquid reaction mixture in a mold. In the course of a complex series of physical-chemical reactions the mixture expands with the evolution of gases while forming a cellular foam product. In the past difficulties have been experienced with leakage of the reaction mixture out of the mold, and with the accumulation of evolved gases in the mold. Leakage of the reaction mixture from the mold results in an imperfect panel having less density than that calculated from the amounts of reactive components inserted into the mold. When gases accumulate in a portion of the mold, such an accumulation will cause a void in the resultant product. One known method for venting air and evolved gases has been to provide small capped openings in the upper surface of the mold. Through these openings an operator watches the foam formation, and when the foam approaches the upper surface of the mold, the openings are closed. While this procedure has met with some success, it has inherent disadvantages especially when the product being formed is of considerable size. Known constructions also suffer from the disadvantage that since the product requires some time to set after the molding operation before it can be removed from the mold, the mold is unproductive during that period and only a few panels may be made per hour.

In contradistinction, the present invention provides removable mold sections constituting side forms for the product. Sealing means such as wax paper is applied to the inner surfaces of the mold sections so as to prevent leakage of the reaction mixture therethrough and to prevent sticking of the product to the mold sections. Recess means are provided adjacent the corners of the mold to vent gases without, however, any substantial penetration of the plastic product into the recesses. The removable mold sections restrain the lateral edges of the foamed product. Therefore, the product, with the mold sections still restraining its lateral edges, may be removed from the press after a shorter curing time and the cure completed elsewhere since the mold sections will prevent deformation of the lateral edges of the product. When the product is laminated, a laminate layer bonded to the foam also functions to support the foam and enables the curing time in the mold to be reduced.

Accordingly, one of the objects of the present invention is to provide a laminating press mold for manufacturing foam products of essentially uniform cellular structure.

Another object of the present invention is to provide apparatus for manufacturing foam slabs having integral offset surface portions.

Still another object of the present invention is to provide improved means for venting gases from a mold used in the production of a polyurethane foam.

These and other objects, features and advantages of the present invention will become more apparent when reference is made to the accompanying drawing wherein:

FIGURE 1 is a diagrammatic side view of a press for carrying out the present invention with certain parts broken away;

FIGURE 2 is an exploded view indicating how the removable mold sections of the present invention are assembled;

FIGURES 3 and 4 are partial elevational views showing details of the removable mold sections;

FIGURE 5 illustrates a jig for use in producing a foam product having offset surface portions;

FIGURE 6 shows a panel having integral joint portions produced in accordance with the present invention; and FIGURE 7 shows a panel with reinforcing means produced in accordance with the present invention.

Referring now to the drawing and more particularly to FIGURE 1, reference numeral 10 generally designates a press for carrying out the present invention. Press 10 includes an upper platen 11 and a lower platen 12. Lower platen 12 is supported upon groups of beams 13, 14 and 15. Beams 13 and 15 extend essentially at right angles to beams 14. Upper platen 11 is secured to an upper press section 16 by welding or similar conventional securing means.

The upper and lower platens 11 and 12 are pivotally hinged with respect to each other by means of opposed upper and lower pillow block bearings 17 and 18 having a shaft 19 extending therethrough. A series of such bearings extend the length of the mold and are secured to upper press section 16 and to a U-shaped guide member 21 by bolts 20. A plurality of screw jacks 22 are connected to guide member 21 by flanges 23 which are welded to guide member 21. Guide member 21 is slidably secured within a channel member 24 which is reinforced by support 25. Shaft 26 interconnects screw jacks 22 so that the jacks may be raised or lowered in unison to vary the distance between platens 11 and 12 in accordance with the desired thickness of the end product.

A series of hydraulic hold-down cylinders 27 are arranged along the opposite side of the mold. Cylinders 27 are pivotally secured to an angle iron from 28 of the upper press by suitable shaft means. A shaft 29 depends downwardly from each of the hydraulic cylinders 27. Shafts 29 are interconnected by a horizontally extending locking rod 30. Rod 30 is manually pushed beneath hooks 31 attached to support member 15 to hold the press in the closed position. The travel of cylinders 27 on their respective shafts may be equated to any adjustment in the thickness of the product occasioned by screw jacks 22. Manual clamps could be provided in place of hydraulic cylinders 27, however, the hydraulic means are preferred.

Since a press of this type may weigh in the order of 5000 lbs., counterweights 32 are placed upon upper press section 16 facilitating raising and lowering upper platen 11 and as a safety feature to reduce the force with which the upper platen may fall. Optionally, an additional hydraulic cylinder (not shown) may be connected between the lower base of the press and the underside of the upper press section 16 to open and close the press hydraulically.

The removable mold sections of the present invention and an illustrative manner of assembling these elements is shown in FIGURE 2. The removable mold sections include a front form 33, a rear form 34, and side forms 35 and 36. Prior to assembly, release means such as a sheet of wax paper 37 is placed in position so as to partially surround side frame 35. Similar release means which would be applied to the other mold sections are not illustrated for the sake of clarity. To assemble the mold sections, pins 39 at opposite ends of rear frame 34 are inserted into apertures 38 in side frames 35 and 36. Front frame 33 may then be positioned against the front edges of side frames 35 and 36 so that the threaded elements 40 on the side frames pass through the elongated recesses 41 in front frame 33. Nuts 42 (FIGURE 1) are then threaded onto members 40 to tighten the assembly. The release means are compressed during this tightening and thus function also as sealing means preventing leakage through the joints between the forms.

Approximately the upper half of rear form 34 adjacent pins 39 is cut back or tapered slightly from the vertical as is evident from FIGURE 3. Side form 35 is also tapered in its upper portion adjacent the threaded member 40 as is evident in FIGURE 4. Side form 36 is similarly tapered. The taper in these figures has been exaggerated for the purposes of illustration. Preferably the taper is in the order of a fraction of an inch, for example, 1/64 of an inch. The object of these tapered portions is to provide recess means extending from the interior of the mold to the atmosphere so as to vent air and gases evolved in the mold during the foaming and/or laminating procedures. For example, the recess means are provided only in the upper half of the forms. The foam evolved in the molds will thus have its ultimate configuration substantially determined and will be in a thick, tacky state before the foam reaches the upper half of the forms. Additionally, the recesses are preferably at least partially covered by the wax paper functioning as sealing and release means. Gases may be exhausted ligible passage of foam into the recesses. The pressure from the mold through these small recesses with negwithin the mold will be sufficient, however, to force gases out through the recesses despite the presence of the release means and the small size of the recesses.

The operation of the apparatus described so far is as follows:

The inwardly facing surfaces of mold sections 33 to 36 are covered with release means. The mold sections are then assembled and placed upon the lower platen 12. In the event that a polyurethane foam panel is the desired product, a reaction mixture including a polymeric material, a blowing agent and an isocyanate is distributed evenly within the mold over the lower platen which in this instance is provided with releasing means such as a layer of wax paper. Upper platen 11 is then moved downwardly onto the upper surfaces of mold sections 33 to 36 during the delay period before the reaction mixture foams. Heat is then applied via electric strip heaters (not shown) or similar heating means. As the foam expands upwardly, gases are vented from the mold via the recesses provided by tapering the upper portions of mold sections 34 to 36 in the manner discussed previously. After the foaming is completed, the product is retained in the mold to partially cure the same by heat treatment. Thereafter, upper platen 11 is moved upwardly to allow the mold sections 33 to 36 and the foam product laterally bounded thereby to be removed as a single unit. The press is then ready for another operating cycle. In the next cycle an alternate set of removable mold sections is utilized so that the first set may continue to laterally restrain the foam product while curing is being completed externally of the press.

In the event that a laminar product is desired, the release means on the lower platen may be replaced by a laminate of the material to be bonded to the foam. Similarly, a sandwich-type of laminar structure may be obtained by securing a second laminate in the upper region of the mold so as to be contacted by the foam and bonded thereto while in the mold.

FIGURE 5 shows a jig 43 provided with raised portions 44, for producing elongated indentations in the foam product. The elongated indentations in the product may be placed over furrings strips to facilitate assembly of the panels into walls or compartments. Jig 43 may be placed on top of removable mold sections 33 to 36 before upper platen 11 is lowered, and is provided with apertures 45 to aid in securing the jig in place and/or in handling. It is apparent that the upper contour of the product is susceptible of many variations by using different jigs.

FIGURE 6 shows two panels produced according to the present invention having integral covers 46 and interengageable tongue and groove joint portions 47 and 48. The tongue and groove joints are obtained by either suitably contouring the inner walls of opposite removable mold sections or by the use of additional insert members. In a similar manner other types of interlocking joints such as a ship lap type joint may be obtained. In interlocking such joints, an adhesive is preferably applied therein so as to form an air-tight seal, however, the use of an adhesive will not always be required but is dictated only by the ultimate use of the panels. Panels of this type are susceptible of varied usages as indicated previously.

FIGURE 7 shows a laminated, reinforced panel 50 which is especially adapted for use in constructing freezer compartments since the thermal conductivity of such panels is in the order of 0.13. Laminar panel 50 includes outer layers 51 and 52 which may be plywood, aluminum or like material, and slabs 53 and 54 of cellular material sandwiched between layers 51 and 52 and intimately bonded thereto. A transverse reinforcing member 55 separates the cellular slabs 53 and 54. Reinforcing element 55 is provided with apertures 56 so that the pressures in the foam slabs 53 and 54 on each side thereof may equalize. Without such pressure equalizing means, reinforcing element 55 would be distorted by the pressure inequality present. Another transverse reinforcing element 57 is secured adjacent one end of the structure and projects beyond the cover panels 51 and 52. At the opposite end of the structure, panels 51 and 52 project beyond foam slab 53. The projecting ends of covers 51 and 52 may be utilized to engage a reinforcing element 57 of another panel. In some instances the reinforcing member 57 will be omitted so that covers 51 and 52 project outwardly forming joints at each end. In another embodiment, one of the covers may project at one end only, and the other cover may project at the other end. It will be appreciated that the present invention is susceptible of forming overlapping joints of many configurations. The panel of FIGURE 7 may be provided with longitudinally extending joints also such as the tongue and groove joints shown in FIGURE 6.

In making a rigid foam in accordance with the present invention, the reaction mixture includes an isocyanate and a polymeric material, and a blowing agent such as trichloromonofluoromethane, commonly known as Freon. In making a flexible foam, water may be utilized as a cross linking medium. Suitable chemicals for the reaction mixture are listed in my copending application entitled Method and Apparatus for Manufacturing Polyurethane Foams filed of even date herewith.

Panels produced in accordance with the present invention may have a density of between 1 lb. and 10 lbs. per cubic foot. Panels of a density of 2 lbs. per cubic foot are capable of continuous use at temperatures down to $-50°$ F. without collapse. In fact, a panel produced in accordance with the present invention has withstood blasts of liquid nitrogen at −100° F. A representative panel has the following characteristics:

| | |
|---|---|
| Density, lbs./cu. ft. | 2.–2.2 |
| Thermal conductivity (B.t.u.-inch/ft.-hr., ° F.) | 0.13 |
| Compressive strength, p.s.i. | 48 |
| Tensile strength, p.s.i. | 55 |
| Shear strength, p.s.i. | 33 |
| Water absorption, #/sq. ft. area | .06 |
| Water vapor transmission (perms. 1# thick) | 1.0 |
| Air permeance, cu. ft. hr. ft. at 10″ water static pressure 1# thick less than | .01 |
| Percent closed cell | 92–95 |
| Percent deflection at yield | 7.5 |
| Maximum use temperature ° F. continuous | −50° to +170° |
| Fire resistance rating | Self-extinguishing |

While I have shown and described preferred embodiments in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A laminating press mold for producing a cellular product by the pressure generated within the product itself and having an upper platen and a lower platen, removable mold sections positioned upon said lower platen, means to raise and lower said upper platen into and out of an operative position in engagement with said mold sections, said means including opposed upper and lower pillow-block bearings interconnected by a common shaft, said upper bearing being secured to said upper platen, said lower bearings being secured to movable guide means, means structurally associated with said guide means for raising and lowering said guide means and therewith varying the distance between said upper and lower platens in the operative position, a guide channel substantially co-extensive with said common shaft said guide means being slidably engaged within said guide channel, and means at the opposite side of said mold from said pillow bearings to lock said mold in the operative position including hydraulic cylinders secured at one end to one free end of said upper platen and at the other end having means lockingly engageable with said lower platen.

2. A laminating press mold for producing a cellular product by the pressure generated within the product itself and having an upper platen and a lower platen, support means for said lower platen, removable mold sections positioned upon said lower platen, means to raise and lower said upper platen out of and into an operative position in engagement with said mold sections, said means including interconnected upper and lower pillow-block bearings, said upper bearing being secured to said upper platen, said lower bearings being secured to movable guide plate means, a plurality of commonly actuated screw jacks for raising and lowering said guide plate means to effect a predetermined spacing between said upper and lower platens in the operative position, said guide plate means being slidably engaged within a guide channel, and means at the opposite side of said mold from said pillow bearings to retain said mold in the operative position.

3. In a mold for manufacturing cellular products the improvement comprising removable mold sections constituting side forms for said mold, said removable mold sections having offset joint portions at least at one end thereof, and means to rigidly clamp joint portions of adjacent mold sections together, at least some of said mold sections being tapered in the upper end regions to provide a slight clearance between adjacent mold sections when clamped together.

4. In a mold for manufacturing cellular products, the improvement comprising removable mold sections each constituting a side form for said mold, adjacent one of said mold sections having complementary joint portions at both ends, and means to rigidly clamp adjacent mold sections together, at least some of said mold sections having tapered transversely extending upper surface portions adjacent said joint portions to provide a slight clearance thereat between adjacent mold sections.

5. A laminating press mold for producing a cellular product, comprising an upper platen and a lower platen, support means for said lower platen, removable mold form means positioned on said lower platen, means to lower said upper platen onto said mold form means into a closed position, and vent means to exhaust gasses from within the region enclosed by said mold form means and said upper and lower platens, said removable mold form means including removable mold sections constituting side forms for said mold, said removable mold sections having offset joint portions at least at one end thereof, and means for rigidly clamping together joint portions of adjacent mold sections, at least some of said mold sections being tapered in the upper end regions thereof to provide a slight clearance between adjacent mold sections when clamped together and thereby constituting said vent means.

6. A laminating press mold for producing a cellular product and having an upper platen and a lower platen, support means for said lower platen, removable mold sections positioned upon said lower platen, said removable mold sections each constituting a side form for said mold, adjacent one of said mold sections having complementary joint portions at both ends, and means for rigidly clamping together adjacent mold sections, means to raise and lower said upper platen out of and into an operative position in engagement with said mold sections, said last mentioned raising and lowering means including interconnected upper and lower pillow-block bearings, said upper bearing being secured to said upper platen, said lower bearings being secured to movable guide plate means, a plurality of commonly actuated screw jacks for raising and lowering said guide plate means to effect a predetermined spacing between said upper and lower platens in the operative position, said guide plate means being slidably engaged within a guide channel, means at the opposite side of said mold from said pillow-block bearings to retain said mold in the operative position, at least some of said mold sections having tapered transversely extending upper surface portions adjacent said joint portions to provide a slight clearance thereat between adjacent mold sections.

References Cited by the Examiner

UNITED STATES PATENTS

| | | | |
|---|---|---|---|
| 1,523,104 | 1/25 | Doe | 154–45.9 |
| 1,645,248 | 10/27 | Lower. | |
| 2,376,653 | 5/45 | Boyer | 154–45.9 |
| 2,445,894 | 7/48 | Troiel | 25–121 |
| 2,514,805 | 7/50 | Seymour | 25–121 |
| 2,570,989 | 10/51 | Seelig | 18–16.5 |
| 2,590,156 | 3/52 | Carpentier | 18–48 |
| 2,744,042 | 5/56 | Pace | 18–59 |
| 2,765,493 | 10/56 | Winstead. | |
| 2,777,162 | 1/57 | Banzhor | 18–16.5 |
| 2,781,570 | 2/57 | Seymour | 25–121 XR |
| 2,819,209 | 1/58 | Pall et al. | |
| 2,899,708 | 8/59 | Donaldson et al. | 18–48 |
| 2,929,104 | 3/60 | Hutton | 18–16 XR |
| 2,976,577 | 3/61 | Gould | 18–59 |

OTHER REFERENCES

Koppers Technical Manual, Chapter 3e, Nov. 15, 1959, pp. 6–11.

WILLIAM J. STEPHENSON, *Primary Examiner.*

MICHAEL U. BRINDISI, *Examiner.*